US012493253B2

(12) United States Patent
Kayama

(10) Patent No.: US 12,493,253 B2
(45) Date of Patent: Dec. 9, 2025

(54) IMAGE FORMING APPARATUS

(71) Applicant: CANON KABUSHIKI KAISHA, Tokyo (JP)

(72) Inventor: Takahiro Kayama, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/829,377

(22) Filed: Sep. 10, 2024

(65) Prior Publication Data

US 2025/0138455 A1 May 1, 2025

(30) Foreign Application Priority Data

Oct. 31, 2023 (JP) ................................ 2023-186640

(51) Int. Cl.
*G03G 15/20* (2006.01)
*G03G 15/00* (2006.01)

(52) U.S. Cl.
CPC ..... *G03G 15/2028* (2013.01); *G03G 15/5029* (2013.01); *G03G 15/657* (2013.01); *G03G 15/70* (2013.01); *G03G 2215/00409* (2013.01); *G03G 2215/00413* (2013.01); *G03G 2215/00535* (2013.01); *G03G 2215/00556* (2013.01); *G03G 2215/00603* (2013.01); *G03G 2215/00611* (2013.01); *G03G 2215/00628* (2013.01); *G03G 2215/2045* (2013.01)

(58) Field of Classification Search
CPC ........... G03G 15/2028; G03G 15/5029; G03G 15/657; G03G 15/70; G03G 2215/00409; G03G 2215/00413; G03G 2215/00535; G03G 2215/00556; G03G 2215/00603; G03G 2215/00611; G03G 2215/00628; G03G 2215/2045
See application file for complete search history.

(56) References Cited

U.S. PATENT DOCUMENTS

2019/0086843 A1* 3/2019 Sato .................. G03G 15/5029
2019/0127167 A1* 5/2019 Mori .................... G03G 15/657
2023/0221665 A1* 7/2023 Aihara ................. G03G 15/657
399/68

FOREIGN PATENT DOCUMENTS

JP 2018-31836 A 3/2018
JP 2021-039254 A 3/2021

* cited by examiner

*Primary Examiner* — Joseph S Wong
(74) *Attorney, Agent, or Firm* — Venable LLP

(57) ABSTRACT

An image forming apparatus includes
- a transfer portion;
- a fixing portion;
- a detection unit that is capable of detecting a deflection amount of the recording material; and
- a controller configured to control a conveying speed of the fixing portion.

The detection unit has a contact portion and a detection portion, and
the contact portion is movable to a first position and a second position.
The controller moves the contact portion from the second position by outputting the signal for setting the conveying speed to a second speed larger than the conveying speed when the contact portion is located at the second position, and
the controller determines an abnormal state when the contact portion is located at the second position and an output time of the signal is longer than or equal to a predetermined time.

8 Claims, 8 Drawing Sheets

IMAGE FORMING APPARATUS

BACKGROUND OF THE INVENTION

Field of the Invention

The present invention relates to an image forming apparatus such as a copying machine, a printer, a facsimile machine, or a multifunction peripheral having a plurality of functions thereof using an electrophotographic system or an electrostatic recording system.

Description of the Related Art

Conventionally, in an image forming apparatus of an electrophotographic system, when a failure occurs, a customer engineer (hereinafter, referred to as CE) goes to an installation place to repair the failure. In particular, since a fixing device that fixes a toner image to a recording material, which is used in the image forming apparatus of the electrophotographic system, is a consumable, timely maintenance is required in order to continue printing a high-quality image.

Therefore, there is a demand for a technique of predicting a life of the fixing device and notifying the CE and a user of a replacement time of the fixing device at an appropriate timing.

Therefore, in a fixing device described in Japanese Patent Application Laid-Open No. 2018-31836, there has been proposed a technique of acquiring start-up torque information at the time of start-up, from a state in which a drive unit of the fixing device is stopped, and determining a life of the fixing device from the information.

In addition, in a fixing device described in Japanese Patent Application Laid-Open No. 2021-39254, a technique has been proposed in which a sensor that detects a deflection amount of a recording material is provided between a transfer portion that transfers an image to a sheet and a fixing portion that fixes the transferred image, and when there is no signal of the sensor for a certain period of time or more, the fixing device is determined to be at an end of a life.

SUMMARY OF THE INVENTION

An image forming apparatus according to the present invention includes: a transfer portion configured to nip and convey a recording material and transfer a toner image to the recording material;

a fixing portion that is located on a downstream side of the transfer portion in a conveyance direction of the recording material, and configured to nip and convey the recording material conveyed from the transfer portion to fix the toner image on the recording material;

a detection unit that is disposed between the transfer portion and the fixing portion and is capable of detecting a deflection amount of the recording material; and a controller configured to control a conveying speed of the fixing portion, wherein the detection unit has a contact portion that comes into contact with the recording material and a detection portion that detects a position of the contact portion, wherein the contact portion is movable to a first position and a second position where the recording material is located by being deflected more than when the contact portion is at the first position, wherein the controller moves the contact portion from the first position toward the second position by outputting a signal for setting the conveying speed of the fixing portion to a first speed smaller than a conveying speed of the transfer portion when the contact portion is located at the first position, and moves the contact portion from the second position toward the first position by outputting the signal for setting the conveying speed of the fixing portion to a second speed larger than the conveying speed of the transfer portion when the contact portion is located at the second position, and wherein the controller determines an abnormal state of the fixing portion when the contact portion is located at the second position, and an output time of the signal for setting the conveying speed of the fixing portion to the second speed is longer than or equal to a predetermined time.

Further features of the present invention will become apparent from the following description of exemplary embodiments (with reference to the attached drawings).

DESCRIPTION OF THE EMBODIMENTS

Hereinafter, a preferred embodiment of the present invention will be described in detail with reference to the drawings. Note that the components described in the following embodiment are merely examples, and various conditions such as a configuration, a function, a dimension, a material, a shape, a relative arrangement, and the like of an apparatus to which the present invention is applied can be appropriately modified or changed without departing from the gist of the present invention, and are not limited to the following embodiment.

Figure 1:
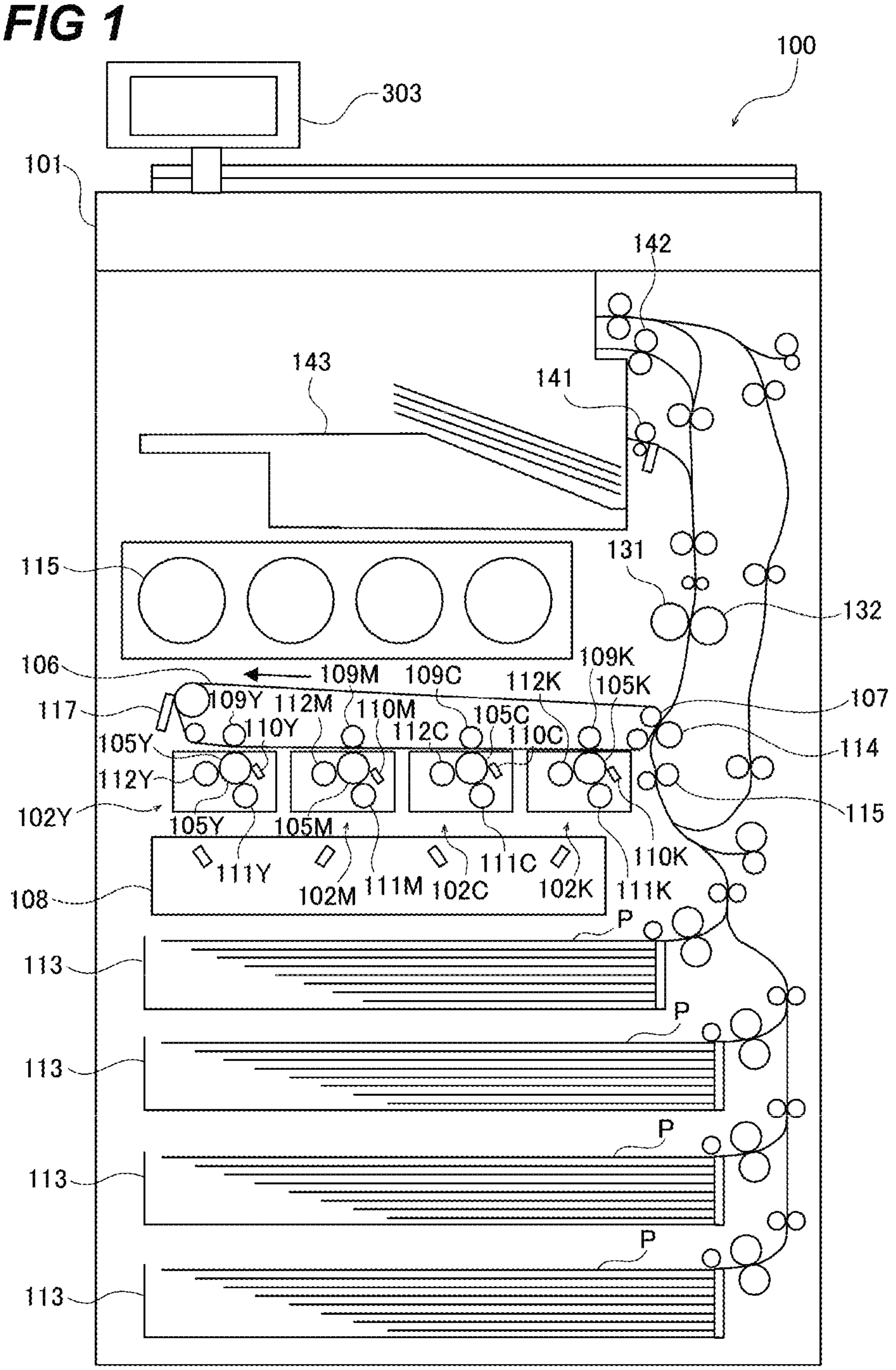
FIG. 1 is a schematic front cross-sectional view of an image forming apparatus according to an embodiment of the present invention.
Figure 2:
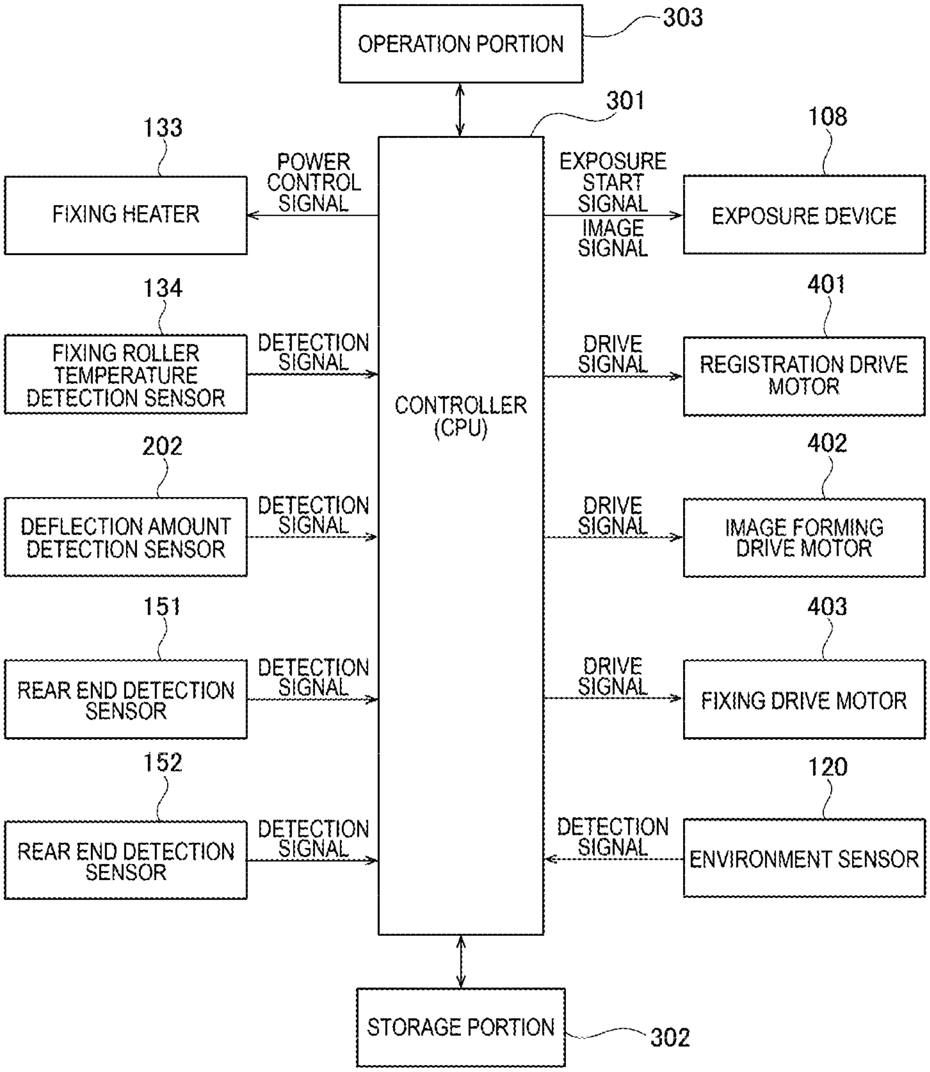
FIG. 2 is a circuit block view for controlling the image forming apparatus of FIG. 1 according to the embodiment of the present invention.

FIG. 1 is a schematic front cross-sectional view of an image forming apparatus according to an embodiment of the present invention illustrating an outline of an intermediate transfer-type tandem color digital printer having four image forming portions as the image forming apparatus to which the present invention is applied. FIG. 2 is a circuit block view according to the embodiment of the present invention for controlling the image forming apparatus of FIG. 1.

First, the outline of the image forming apparatus according to the embodiment of the present invention will be described.

In FIG. 1, an image forming apparatus 100 includes an operation portion 303 that enables a user to operate job setting, and a housing 101, and the housing 101 incorporates each mechanism for configuring the image forming portions, and a control board storage portion (not illustrated) that stores a controller 301 including a CPU illustrated in FIG. 2 that performs control related to each image forming process by each mechanism. In addition, an environment sensor 120 illustrated in FIG. 2 for acquiring temperature and humidity as an external environment is also disposed.

Image forming portions 102Y, 102M, 102C, and 102K form images of respective colors of yellow (Y), magenta (M), cyan (C), and black (K), respectively. Photosensitive drums 105Y, 105M, 105C, and 105K as image bearing members in the respective image forming portions 102Y, 102M, 102C, and 102K are rotationally driven in a clockwise direction in FIG. 1 respectively, and surfaces thereof are charged with uniform charges by charging rollers 111Y, 111M, 111C, and 111K, respectively.

Next, respective image signals of yellow, magenta, cyan, and black are input from the controller 301 to a laser scanner 108 as an exposure device, and drum surfaces of the respective photosensitive drums 105Y, 105M, 105C, and 105K are irradiated with laser light according to the image signals to neutralize the charges and form electrostatic latent images.

The electrostatic latent images formed on the photosensitive drums 105Y, 105M, 105C, and 105K are developed with a developer by developing devices 112Y, 112M, 112C, and 112K, respectively. That is, each of the developing devices 112Y, 112M, 112C, and 112K attaches toner charged to a same polarity as a charging polarity of each of the photosensitive drums 105Y, 105M, 105C, and 105K to make the electrostatic latent images appear as toner images of yellow, magenta, cyan, and black (reversal development).

The toner images developed on the photosensitive drums 105Y, 105M, 105C, and 105K are sequentially transferred onto an intermediate transfer belt 106 rotationally driven in a counterclockwise direction in FIG. 1 by primary transfer rollers 109Y, 109M, 109C, and 109K (primary transfer), and are superimposed on the intermediate transfer belt 106, thereby forming a full-color toner image. At this time, a primary transfer voltage (primary transfer bias) which is a DC voltage having an opposite-polarity to the charging polarity of the toner at the time of development is applied to the primary transfer rollers 109Y, 109M, 109C, and 109K. Transfer residual toners remaining on the photosensitive drums 105Y, 105M, 105C, and 105K are removed and collected by drum cleaners 110Y, 110M, 110C, and 110K, respectively.

On the other hand, a recording material P such as a sheet fed from storages 113 accommodating the recording material P is sent to a registration roller 115 configuring a registration portion. After a leading end of the recording material P abuts against the stopped registration roller 115 to form deflection (loop) on the recording material P, a drive signal is input from the controller 301 to a registration drive motor 401 illustrated in FIG. 2 so as to be synchronized with the toner image on the intermediate transfer belt 106, and the registration roller 115 is started to rotate.

Then, the recording material P is conveyed to a secondary transfer portion where a secondary transfer inner roller 107 and a secondary transfer outer roller 114 abut on each other via the intermediate transfer belt 106. Note that examples of the recording material P include sheet materials such as a sheet and a plastic sheet.

The toner image on the intermediate transfer belt 106 is transferred to the recording material P nipped and conveyed by the secondary transfer outer roller 114 in the secondary transfer portion (secondary transfer). At this time, a secondary transfer voltage (secondary transfer bias), which is a DC voltage having the opposite-polarity to the charging polarity of the toner at the time of development, is applied to the secondary transfer outer roller 114. Transfer residual toner on the intermediate transfer belt 106 remaining without being transferred in the secondary transfer portion is removed and collected by an intermediate transfer belt cleaner 117.

The toner image on the recording material P transferred to the recording material P is fixed to the recording material P by heat and pressure at the fixing portion located on a downstream side in a conveyance direction of the recording material P.

The fixing portion includes a fixing roller 131 and a pressure roller 132 forming a pair of rotating members, and a fixing heater 133 illustrated in FIG. 2 as a heating member. In the fixing roller 131, a rubber layer having a high thermal conductivity is formed on a thin tubular metal base layer, and a toner parting layer of a fluororesin is formed on a surface thereof. The pressure roller 132 is provided with an elastic layer of flexible silicone rubber or the like on an outer side of a solid or hollow cylindrical metal shaft of iron or aluminum, and a toner parting layer of a fluororesin is formed on a surface thereof. The pressure roller 132 is strongly pressed against the fixing roller 131 in order to improve fixability of the toner image, and it forms a planar nip portion.

Heat is applied to the nip portion by the fixing heater 133 included in the fixing roller 131. A surface temperature of the fixing roller 131 is detected by a fixing roller temperature detection sensor 134 illustrated in FIG. 2, and temperature information thereof is input to the controller 301. The controller 301 controls supply power to the fixing heater 133 so that the surface temperature of the fixing roller 131 is maintained at a predetermined temperature based on the temperature information input from the fixing roller temperature detection sensor 134, and it controls the temperature of the fixing roller 131.

In addition to pressurizing the nip portion, when a drive signal is input from the controller 301 to a fixing drive motor 403 illustrated in FIG. 2, the pressure roller 132 rotates by receiving a driving force, and it nips and conveys the recording material P together with the fixing roller 131.

The recording material P on which the toner image has been fixed by the fixing portion is discharged from a discharge portion 141 or a discharge portion 142 onto a discharge tray 143 outside the apparatus.

Next, fixing drive control according to a conveyance timing of the recording material P will be described in detail.

Figure 3B:
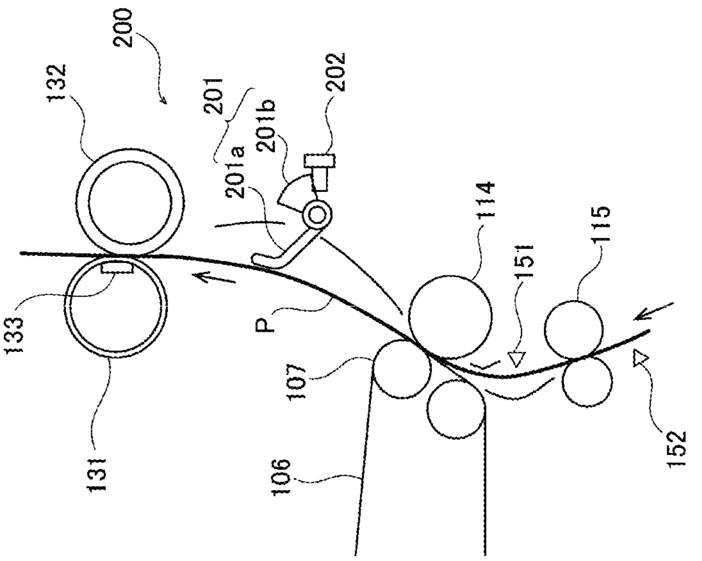
FIGS. 3A and 3B are enlarged views of a recording material conveyance path from a registration portion to a fixing portion according to the embodiment of the present invention.
Figure 3A:
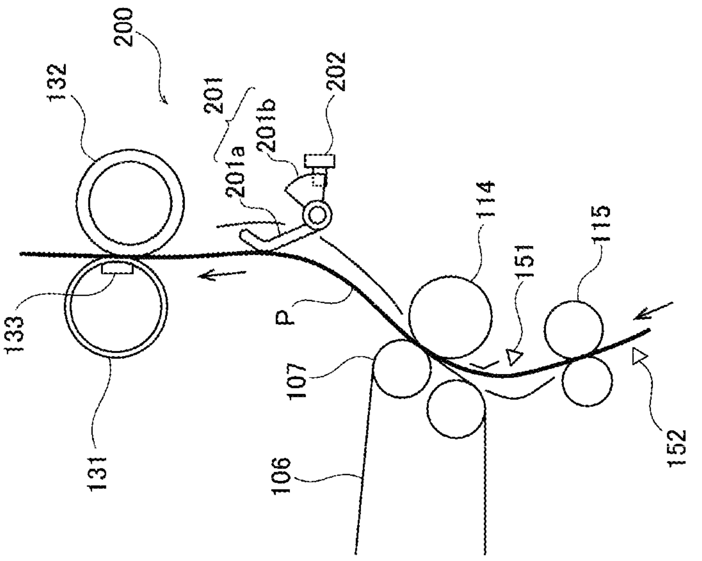

FIGS. 3A and 3B are enlarged views of a conveyance path of the recording material P from the registration portion to the secondary transfer portion and the fixing portion.

In FIGS. 3A and 3B, in the present embodiment, a deflection amount detection flag (contact portion) 201 and a deflection amount detection sensor (detection portion) 202 as a deflection amount detection portion (detection unit) 200 capable of detecting a deflection amount of the recording material P are provided between the secondary transfer portion and the fixing portion.

When the recording material P is conveyed across the secondary transfer portion and the fixing portion, the recording material P is deflected due to a velocity difference in nipping and conveying between the secondary transfer portion and the fixing portion of the recording material P. The deflection amount detection flag 201 is weakly rotationally biased in the counterclockwise direction of FIGS. 3A and 3B by a flag spring (not illustrated). However, when one end 201*a* of the deflection amount detection flag 201 is pressed (comes into contact) from a state of not being in contact with the recording material P according to the deflection amount of the recording material P, the deflection amount detection flag 201 rotates in the clockwise direction of FIGS. 3A and 3B about a rotation axis against a biasing force of the flag spring. A transmissive photosensor (photointerrupter sensor) is used as the deflection amount detection sensor 202, and when light reaches a light receiving element (not illustrated) from a light emitting element (not illustrated) provided to face the deflection amount detection sensor 202, an OFF signal is output, and when the light is blocked, an ON signal is output.

In the present embodiment, as illustrated in FIG. 3A, when the deflection amount of the recording material P becomes greater than or equal to a predetermined amount that is a first deflection amount, one end 201*b* of the deflection amount detection flag 201 blocks an optical axis of the deflection amount detection sensor 202, and is provided so as to change from the OFF signal to an ON signal. That is, when the output of the deflection amount detection sensor 202 is an ON signal, it means that the deflection amount of the recording material P is greater than or equal to the predetermined amount, and when the output of the deflection amount detection sensor 202 is an OFF signal, it means that the deflection amount of the recording material P is less than the predetermined amount that is a second deflection amount as illustrated in FIG. 3B (or the recording material P is not at the detection position of the deflection amount detection portion 200).

Figure 4:
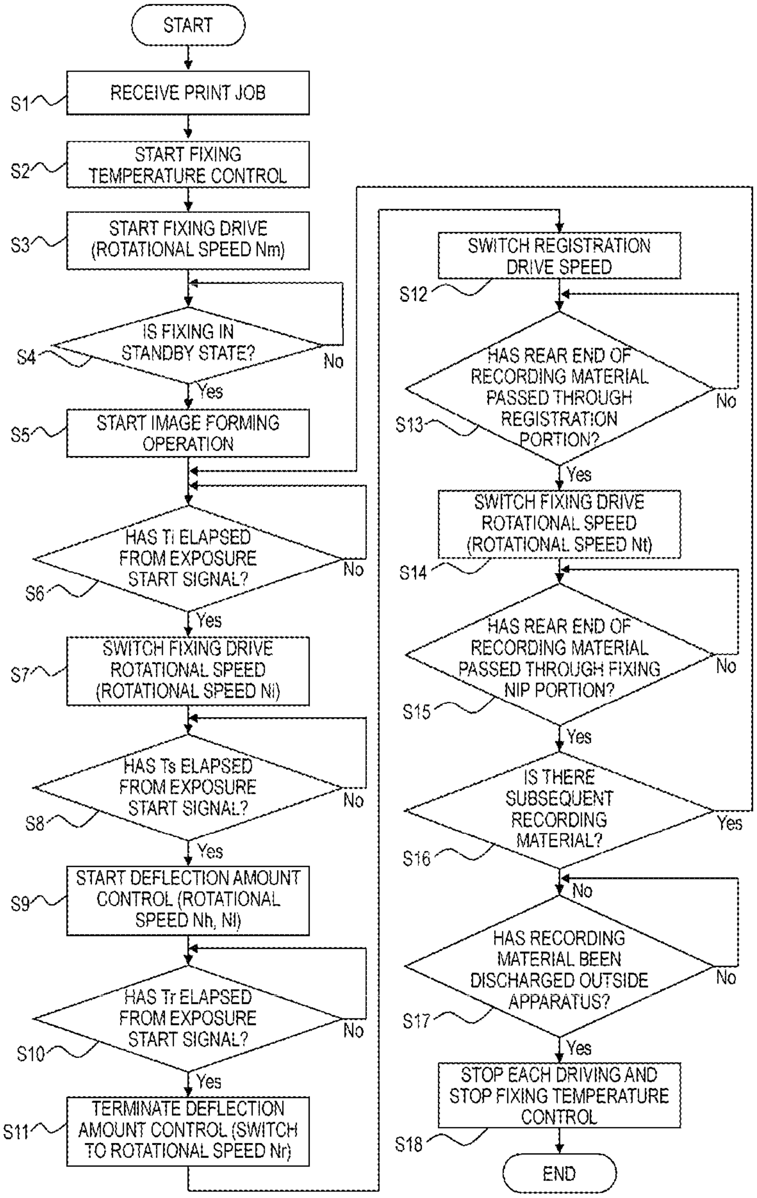
FIG. 4 is a flowchart of fixing drive control of a controller of FIG. 2 according to the embodiment of the present invention.

Next, drive control of the fixing portion will be described according to the flowchart of the controller 301 of FIG. 2 illustrated in FIG. 4.

In step S1, when the controller 301 receives a print job, heating of the fixing roller 131 by the fixing heater 133 is started in step S2, and in a short time, rotational driving of the fixing portion is started in step S3. At this time, it is assumed that a drive rotational speed per second, which is a drive speed of the fixing portion, is Nm.

Thereafter, when the temperature information of the fixing roller 131 is input from the fixing roller temperature detection sensor 134 to the controller 301 and it is detected that the temperature reaches a predetermined temperature, a standby state of the fixing portion is set.

When it is determined in step S4 that the fixing portion is in the standby state, in step S5, an image forming drive motor 402 of the image forming portion illustrated in FIG. 2 is driven to start an image forming operation. As a result, as described above, the recording material P is sent to the fixing portion after the toner image on the intermediate transfer belt 106 is transferred by the secondary transfer portion. At this time, in step S6, the controller 301 proceeds to step S7 at a timing when a predetermined time Ti has elapsed from an exposure start signal until the recording material P reaches the fixing portion, and it switches the drive rotational speed per second of the fixing portion from Nm to Ni.

When the drive rotational speed per second of the fixing portion is Ni, a nipping and conveying speed Vi of the recording material P of the fixing portion is slightly slower than a nipping and conveying speed (speed of the intermediate transfer belt 106) Vs of the recording material P in the secondary transfer portion. This is to prevent the transfer of the toner image from the intermediate transfer belt 106 to the recording material P by the secondary transfer portion from being disturbed by conveying the recording material P between the secondary transfer portion and the fixing portion in a slightly loosened state.

Note that the rotational speed may not be switched by setting the drive rotational speed per second Nm at the start of the temperature control of the fixing roller 131 to a drive rotational speed per second that is the same as the drive rotational speed per second Ni when the recording material P reaches the fixing portion.

When the leading end of the recording material P in the conveyance direction reaches a fixing nip portion, deflection starts to be formed in the recording material P due to the velocity difference in nipping and conveying between the secondary transfer portion and the fixing portion. Furthermore, in step S8, at a timing when a predetermined time Ts has elapsed from the exposure start signal, the processing proceeds to step S9, and the controller 301 starts drive control based on the deflection amount of the recording material P. More specifically, a drive rotational speed per second Nh at which the nipping and conveying speed of the fixing portion is faster than the intermediate transfer belt speed Vs and a drive rotational speed per second Nl at which the nipping and conveying speed of the fixing portion is slower than the intermediate transfer belt speed Vs are selectively switched according to the detection result of the deflection amount detection portion 200. Note that the nipping and conveying speed has a plurality of stages.

That is, when the deflection amount detection portion 200 outputs an ON signal, the deflection amount of the recording material P becomes greater than or equal to a predetermined amount, and thus, it is switched to the drive rotational speed per second Nh at which the nipping and conveying speed of the fixing portion is faster than the intermediate transfer belt speed Vs so that the deflection amount decreases. In addition, when the deflection amount detection portion 200 outputs an OFF signal, the deflection amount of the recording material P becomes smaller than a predetermined amount, and thus, it is switched to the drive rotational speed per second Nl at which the nipping and conveying speed of the fixing portion is slower than the intermediate transfer belt speed Vs so that the deflection amount increases. By switching the drive rotational speed per second of the fixing portion in this manner, the deflection amount of the recording material P is controlled to be substantially constant to a predetermined amount (deflection amount control).

The fixing drive control based on the deflection amount is completed before the recording material P is further conveyed and a rear end of the recording material P passes through the registration portion, and the nipping and conveying speed of the fixing portion is switched so as to reduce the deflection amount between the secondary transfer portion and the fixing portion as much as possible. Specifically, in step S10, at a timing when a predetermined time Tr before the rear end of the recording material P passes through the registration portion has elapsed from the exposure start signal, the processing proceeds to step S11, and the drive rotational speed per second of the fixing portion is changed from Nh or Nl to Nr so that the nipping and conveying speed of the fixing portion becomes faster than the intermediate transfer belt speed Vs. At the same time, in step S12, a conveyance speed Vregi of the registration roller 115 is switched to be slower than the intermediate transfer belt speed Vs. As a result, the deflection amount of the recording material P on an upstream side and a downstream side with the secondary transfer portion interposed therebetween immediately before the rear end of the recording material P passes through the registration portion is reduced.

In step S13, when a rear end detection sensor 152 determines that the rear end of the recording material P has passed through the registration portion, the drive rotational speed per second of the fixing portion is switched from Nr to a drive rotational speed per second Nt lower than a reference drive rotational speed per second N0 again in step S14. As a result, there is no deflection of the recording material P between the secondary transfer portion and the fixing portion, and the recording material P is prevented from being pulled by the fixing portion, and the deflection amount is controlled to be appropriate when the rear end of the recording material P passes through the secondary transfer portion.

When a rear end detection sensor 151 determines that the rear end of the recording material P has passed through the secondary transfer portion, the fixing portion continues to convey the recording material P at the drive rotational speed per second Nt.

Thereafter, when it is determined in step S15 that the rear end of the recording material P has passed through the fixing nip portion, in a case where there is a subsequent recording material, the processing returns to step S6, and at the timing when the predetermined time Ti has elapsed from the exposure start signal for the subsequent recording material P, the processing proceeds to step S7, and the drive rotational speed per second of the fixing portion is switched to Ni to prepare for reaching of a leading end of the subsequent recording material P. On the other hand, in a case where there is no subsequent recording material, the processing proceeds to step S17. When it is detected that the recording material P has been discharged from the discharge portion 141 or the discharge portion 142, a drive input including the fixing portion and power supply to the fixing heater 133 are stopped in step S18, and a print operation is terminated.

Next, failure estimation of the fixing portion by the deflection amount detection sensor 202 in the present embodiment will be described.

As described above, the deflection amount control is performed such that the deflection amount of the recording material P becomes substantially constant to the predetermined amount by switching the drive rotational speed per second of the fixing portion between step S9 and step S11. However, since torque of the fixing portion increases as durability of the fixing portion increases, slip occurs between the fixing roller 131 and the pressure roller 132, and conveyance efficiency of the recording material P in the fixing portion decreases. In the present embodiment, the controller 301 determines an abnormal state of the fixing portion using the result of the deflection amount detection sensor 202 during a deflection amount control time, and it estimates a failure of the fixing portion.

Figure 5:
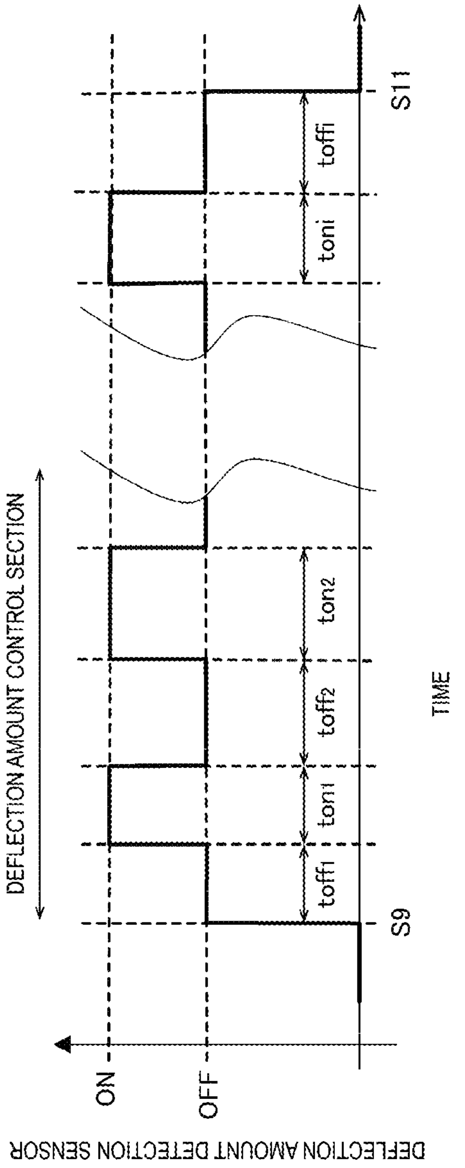
FIG. 5 is a time chart of signals of a deflection amount detection sensor in a deflection amount control section according to the embodiment of the present invention.

FIG. 5 is a time chart of signals of the deflection amount detection sensor in a deflection amount control section.

As illustrated in FIG. 5, during the deflection amount control, the deflection amount of the recording material P is kept substantially constant while repeating a time $ton_i$ (i=1, 2, 3, . . . ) during which the deflection amount detection sensor 202 outputs an ON signal and a time $toff_i$ (i=1, 2, 3, . . . ) during which the deflection amount detection sensor 202 outputs an OFF signal.

When the durability of the fixing portion increases and the conveyance efficiency of the recording material P decreases, the velocity difference in nipping and conveying with the secondary transfer portion increases, and the deflection amount of the recording material P tends to increase. In the present embodiment, when the deflection amount of the recording material P becomes greater than or equal to a predetermined amount, the deflection amount detection sensor 202 outputs an ON signal, and the nipping and conveying speed of the fixing portion is changed to the drive rotational speed per second Nh faster than the intermediate transfer belt speed (nipping and conveying speed) Vs so that the deflection amount decreases. That is, it can be said that the longer a total time ton of the time $ton_i$ during which the deflection amount detection sensor 202 outputs the ON signal is, the lower the conveyance efficiency is.

Therefore, in a case of printing a predetermined number of sheets, when a total time (accumulated time of a period of printing the predetermined number of sheets) ton during which the deflection amount detection sensor 202 outputs an ON signal during the deflection amount control time (alternatively, the time during which the controller 301 outputs a signal for setting the nipping and conveying speed of the fixing portion to the drive rotational speed per second Nh faster than the intermediate transfer belt speed Vs) becomes longer than or equal to a predetermined failure estimation time tc set in advance, the controller 301 can determine the abnormal state due to torque rise of the fixing portion and estimate that a failure is close. Note that, in a case where the image forming apparatus 100 finishes printing the predetermined number of sheets and the total time ton during which the deflection amount detection sensor 202 outputs an ON signal does not become longer than or equal to the predetermined failure estimation time tc set in advance, the total time ton is reset.

In the present embodiment, the total time ton is reset when the predetermined number of sheets are printed. Furthermore, the predetermined number of sheets may be changed according to a size of the recording material.

Figure 6:
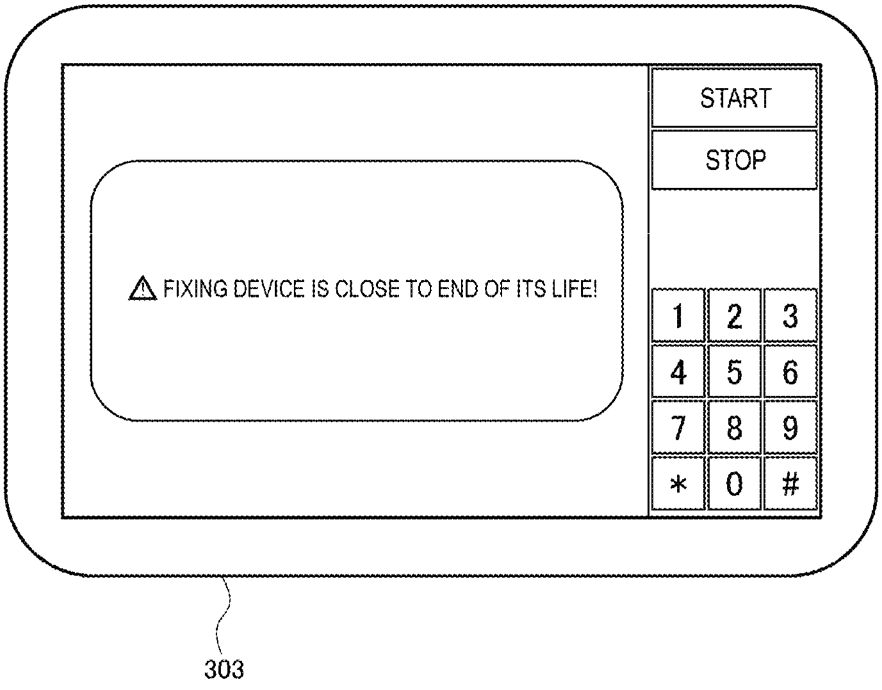
FIG. 6 is an explanatory view illustrating display of an operation portion at a time of failure determination in FIG. 2 according to the embodiment of the present invention.

The controller 301 displays a failure location on the operation portion 303 in FIGS. 1 and 2 as illustrated in FIG. 6 based on the result of estimating that a failure is close. As the display of the operation portion 303, not only the failure location but also maintenance-related information may be displayed. The maintenance-related information is, for example, a component replacement procedure or a work time guide required for maintenance. The maintenance-related information corresponding to the failure location is stored in advance in a storage portion 302 of FIG. 2, and the controller 301 reads the maintenance-related information after failure estimation and displays the maintenance-related information on the operation portion 303, so that the maintenance-related information can also be displayed on the operation portion 303. When the image forming apparatus 100 is connected to a network, the failure location and maintenance-related information are notified to a person in charge of maintenance via the network.

Figure 7:
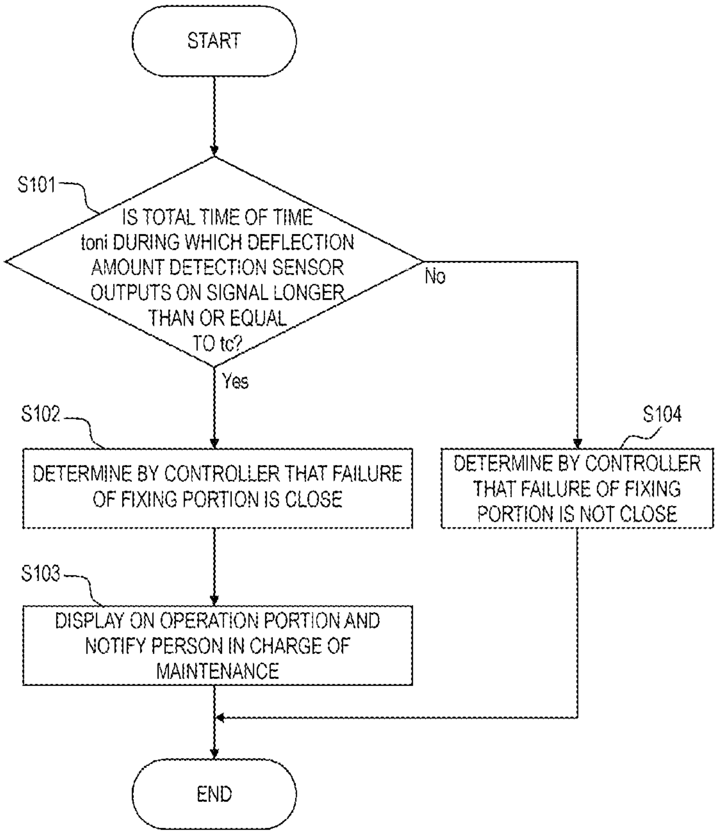
FIG. 7 is a flowchart of failure estimation of the fixing portion of the controller in FIG. 2 according to the embodiment of the present invention.

The above failure estimation of the fixing portion will be described according to the flowchart of the controller 301 of FIG. 2 illustrated in FIG. 7.

First, in step S101, the controller 301 determines whether or not a total time ton during which the deflection amount detection sensor 202 outputs an ON signal during the deflection amount control time is longer than or equal to a predetermined failure estimation time tc set in advance. In a case where it is determined in step S101 that the total time ton during which an ON signal is output is longer than or equal to the failure estimation time tc, the processing proceeds to step S102, and the controller 301 determines that a failure of the fixing portion is close. Thereafter, in step S103, the controller 301 displays a failure location on the operation portion 303 illustrated in FIG. 6, and it notifies a person in charge of maintenance of the failure location and maintenance-related information.

After the failure location is displayed on the operation portion 303 in step S102, the image forming apparatus 100 may not receive a printing operation. In a case where the image forming apparatus 100 is replaced with a new fixing portion after the image forming apparatus 100 stops performing the printing operation, the image forming apparatus 100 may be able to perform the printing operation again.

In the present embodiment, the fixing portion may have individual information such as a barcode, for example. The controller 301 of the image forming apparatus 100 may read the individual information to detect the replacement of the fixing portion.

On the other hand, in a case where it is determined in step S101 that the total time ton during which an ON signal is output is less than the failure estimation time tc, the processing proceeds to step S104, and the controller 301 determines that a failure of the fixing portion is not close.

As described above, according to the present embodiment, it is possible to provide a user and a person in charge of maintenance with useful information that leads to reduction in part preparation required for maintenance treatment of a failure location, a time required for treatment, and a treatment time.

In the above embodiment, when the output of the deflection amount detection sensor 202 is an ON signal, it means that the deflection amount of the recording material P is greater than or equal to the predetermined amount as illustrated in FIG. 3A, and when the output of the deflection amount detection sensor 202 is an OFF signal, it means that the deflection amount of the recording material P is smaller than the predetermined amount as illustrated in FIG. 3B. However, the present invention is not limited thereto, and any other configuration may be used as long as the deflection amount of the recording material P can be detected.

Figure 8B:
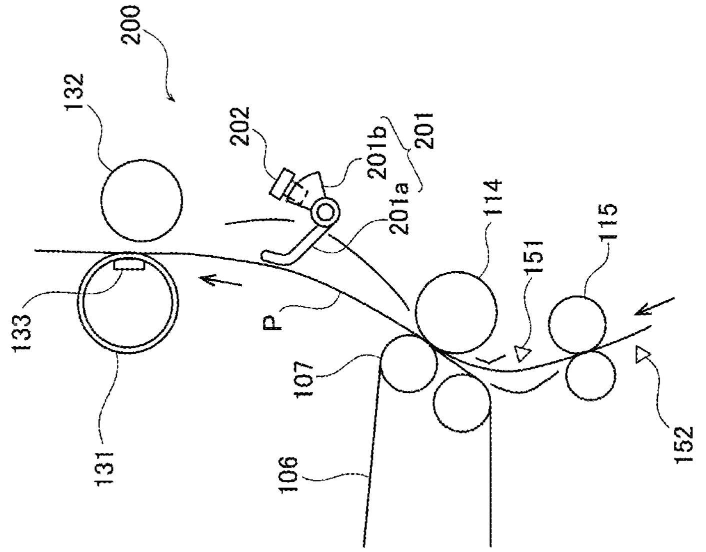
FIGS. 8A and 8B are enlarged views of the recording material conveyance path from the registration portion to the fixing portion according to the embodiment of the present invention.
Figure 8A:
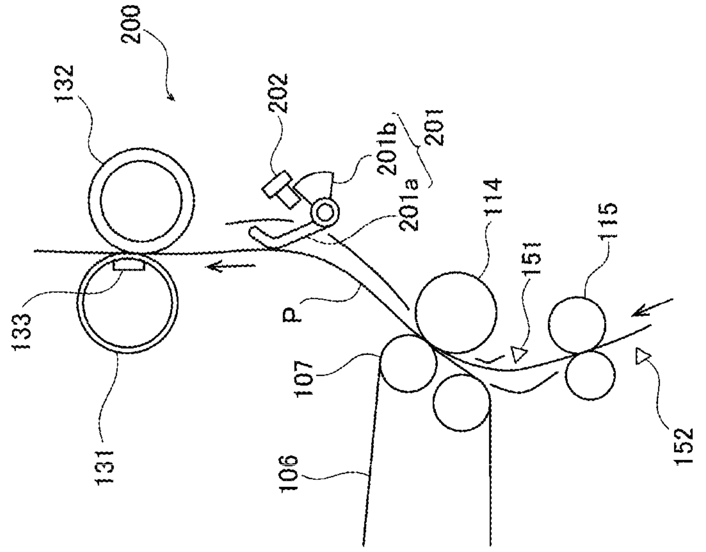

For example, in the enlarged view of the conveyance path of the recording material P from the registration portion to the secondary transfer portion and the fixing portion in FIGS. 8A and 8B, when the output of the deflection amount detection sensor 202 is an OFF signal as illustrated in FIG. 8A, the deflection amount of the recording material P may be greater than or equal to a predetermined amount, and when the output is an ON signal as illustrated in FIG. 8B, the deflection amount of the recording material P may be smaller than the predetermined amount. In this case, when a total time toff during which the deflection amount detection sensor 202 outputs an OFF signal exceeds a predetermined failure estimation time tc set in advance, it can be estimated that a failure due to torque rise of the fixing portion is close.

In the above embodiment, a transmissive photosensor (photointerrupter sensor) is used as the deflection amount detection sensor 202, but an encoder multipoint detection sensor may be included.

Furthermore, in the above embodiment, an abnormal state of the fixing portion is determined by detecting in two stages of whether or not the deflection amount of the recording material P is greater than or equal to a predetermined amount, but the abnormal state of the fixing portion may be determined by detecting whether or not the deflection amount of the recording material P is a first deflection amount larger than the predetermined amount or a second deflection amount less than the predetermined amount, that is, the abnormal state of the fixing portion may be determined in three stages in which a region in which the deflection amount is not determined is provided between the first deflection amount and the second deflection amount.

In addition, the present invention is not limited to the above embodiment, and various changes and modifications can be made without departing from the spirit and scope of the present invention. According to the present invention, it is possible to provide an image forming apparatus capable of determining a life of a fixing device with high accuracy without separately providing a measurement configuration such as detecting torque.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-186640, filed Oct. 31, 2023, which is hereby incorporated by reference herein in its entirety.

What is claimed is:

1. An image forming apparatus comprising:

a transfer portion configured to nip and convey a recording material and transfer a toner image to the recording material;

a fixing portion that is located on a downstream side of the transfer portion in a conveyance direction of the recording material, and configured to nip and convey the recording material conveyed from the transfer portion to fix the toner image on the recording material;

a detection unit that is disposed between the transfer portion and the fixing portion and is capable of detecting a deflection amount of the recording material; and a controller configured to control a conveying speed of the fixing portion, wherein the detection unit has a contact portion that comes into contact with the recording material and a detection portion that detects a position of the contact portion, wherein the contact portion is movable to a first position and a second position where the recording material is located by being deflected more than when the contact portion is at the first position, wherein the controller moves the contact portion from the first position toward the second position by outputting a signal for setting the conveying speed of the fixing portion to a first speed smaller than a conveying speed of the transfer portion when the contact portion is located at the first position, and moves the contact portion from the second position toward the first position by outputting the signal for setting the conveying speed of the fixing portion to a second speed larger than the conveying speed of the transfer portion when the contact portion is located at the second position, and wherein the controller determines an abnormal state of the fixing portion when the contact portion is located at the second position, and an output time of the signal for setting the conveying speed of the fixing portion to the second speed is longer than or equal to a predetermined time.

2. The image forming apparatus according to claim 1, wherein the detection unit has a rotation axis of the contact portion, and the contact portion rotates about the rotation axis when the recording material is deflected.

3. The image forming apparatus according to claim 1, wherein the conveying speed of the transfer portion when the conveying speed of the fixing portion is the first speed and the conveying speed of the transfer portion when the conveying speed of the fixing portion is the second speed are the same.

4. The image forming apparatus according to claim 1, further comprising:

an operation portion configured to enable a user to operate job setting, wherein the controller notifies the operation portion of information related to the abnormal state of the fixing portion when the contact portion is located at the second position and the output time of the signal for setting the conveying speed of the fixing portion to the second speed is longer than or equal to the predetermined time.

5. The image forming apparatus according to claim 1, wherein when the controller determines the abnormal state of the fixing portion, the image forming apparatus does not perform a printing operation.

6. The image forming apparatus according to claim 5, wherein when the fixing portion is replaced with a new fixing portion after the image forming apparatus stops performing the printing operation, the image forming apparatus is capable of performing the printing operation.

7. The image forming apparatus according to claim 1, wherein the controller accumulates the output time of the signal for setting the conveying speed of the fixing portion to the second speed, for a period of printing a predetermined number of sheets, when the contact portion is located at the second position.

8. The image forming apparatus according to claim 7, wherein the controller resets the output time of the signal for setting the conveying speed of the fixing portion to the second speed, after printing the predetermined number of sheets, when the contact portion is located at the second position.

* * * * *